United States Patent
Saker et al.

(10) Patent No.: US 11,689,669 B2
(45) Date of Patent: Jun. 27, 2023

(54) QUOTA ALLOCATION TO SUBSCRIBERS BASED ON CONSUMPTION SPEED, LOCATION, ALLOWANCE, OR COMBINATIONS OF THE SAME

(71) Applicant: Nokia Solutions and Networks Oy, Espoo (FI)

(72) Inventors: Daniel Saker, La Ville du Bois (FR); Renee Fang, Beijing (CN); Xinlan Xia, Beijing (CN); Mark Bryant, Bath (GB)

(73) Assignee: Nokia Solutions and Networks Oy, Espoo (FI)

( * ) Notice: Subject to any disclaimer, the term of this patent is extended or adjusted under 35 U.S.C. 154(b) by 114 days.

(21) Appl. No.: 17/053,670

(22) PCT Filed: May 16, 2018

(86) PCT No.: PCT/EP2018/062680
§ 371 (c)(1),
(2) Date: Nov. 6, 2020

(87) PCT Pub. No.: WO2019/219182
PCT Pub. Date: Nov. 21, 2019

(65) Prior Publication Data
US 2021/0234966 A1   Jul. 29, 2021

(51) Int. Cl.
*H04M 15/00* (2006.01)
*H04W 4/029* (2018.01)

(52) U.S. Cl.
CPC ......... *H04M 15/785* (2013.01); *H04M 15/64* (2013.01); *H04M 15/66* (2013.01); *H04M 15/8027* (2013.01); *H04W 4/029* (2018.02)

(58) Field of Classification Search
CPC .... H04M 15/785; H04M 15/64; H04M 15/66; H04M 15/8027; H04W 4/029
See application file for complete search history.

(56) References Cited

U.S. PATENT DOCUMENTS 9,402,003 B2    7/2016  Bejerano et al.
9,461,829 B2 *  10/2016 Törnkvist ............... H04M 15/80
(Continued)

FOREIGN PATENT DOCUMENTS

CN  102904835 A   1/2013
EP    2466790 A1  6/2012
(Continued)

OTHER PUBLICATIONS

Huang et al., "A Dynamic Reservation Scheme in Online Charging System for Family Shared Plan", IEEE Wireless Communications and Networking Conference (WCNC), Mar. 9-12, 2015, 6 pages.
(Continued)

*Primary Examiner* — Pakee Fang
(74) *Attorney, Agent, or Firm* — Harrington & Smith (57) ABSTRACT

It is provided a method, comprising monitoring if a request for granting a requested quota for a subscriber is received; calculating a quota consumption speed based on a consumption of a previous quota granted to the subscriber and a duration during which the previous quota is consumed; determining a determined quota size based on the quota consumption speed; granting a granted quota to the subscriber in response to the received request, wherein the granted quota has the determined quota size.

17 Claims, 9 Drawing Sheets

(56) References Cited

U.S. PATENT DOCUMENTS

| | | | |
|---|---|---|---|
| 2016/0127210 A1* | 5/2016 | Noureddin | H04M 15/61 |
| | | | 455/405 |
| 2016/0255159 A1 | 9/2016 | Beasley et al. | |
| 2016/0294569 A1 | 10/2016 | Chen et al. | |
| 2016/0352638 A1* | 12/2016 | Kosseifi | H04W 28/0226 |
| 2019/0182838 A1* | 6/2019 | Bondarenko | H04M 15/00 |

FOREIGN PATENT DOCUMENTS

| | | |
|---|---|---|
| EP | 2944060 A1 | 11/2015 |
| WO | 2014/108801 A1 | 7/2014 |
| WO | 2017/222434 A1 | 12/2017 |

OTHER PUBLICATIONS

"Answering Challenges of the Volte Era", Amdocs White Paper, Feb. 2015, 7 pages.

International Search Report and Written Opinion received for corresponding Patent Cooperation Treaty Application No. PCT/EP2018/062680, dated Nov. 29, 2018, 14 pages.

Office action received for corresponding European Patent Application No. 18726104.5, dated May 13, 2022, 6 pages.

\* cited by examiner

|  | | 1st Window's Period | | | | | | 2nd Window's Period | |
|---|---|---|---|---|---|---|---|---|---|
|  | CCRi | 1st CCRu | 2nd CCRu | 3rd CCRu | 4th CCRu | 5th CCRu | 6th CCRu | 7th CCRu | 8th CCRu |
| CCRi/u Start Time | 7:30 | 8:00 | 8:30 | 9:00 | 9:30 | 10:00 | 10:30 | 10:50 | 11:10 |
| Consumed Quota Size (MB) |  | 12 | 15 | 18 | 9 | 18 | 9 | 10 | 12 |
| Quota Consuming Duration (min) |  | 30 | 30 | 30 | 30 | 30 | 30 | 20 | 20 |
| Cumulative Quota Consuming Duration (min) | 0 | 30 | 60 | 90 | 120 | 150 | 180 | 20 | 40 |
| Consuming Speed | Default Speed | 12/30 =0.4 | 27/60 =0.45 | 45/90 =0.5 | 54/120 =0.45 | 72/150 =0.48 | 81/180 =0.45 | 0.45*0.89+(10/20)*0.11=0.455 See note 1 | 0.45*0.78+(22/40)*0.22=0.472 See note 2 |
|  |  |  |  |  |  |  | Window reset => Stored pre period speed = 0.45 |  |  |
| Data Period for consuming speed = 3 hours = 180 min | | | | | | | | | |

Note:
1. The weight for 7th CCRu in 2nd window period: 20min/180min=0.11; Weight for previous window: 1-0.11=0.89; so consuming Speed = 0.45*0.89+10/20*0.11=0.455
2. The weight for 8th CCRu in 2nd window period: 40min/180min=0.22; Weight for previous window: 1-0.22=0.78; so consuming Speed = 0.45*0.78+22/40*0.22=0.472

QUOTA ALLOCATION TO SUBSCRIBERS BASED ON CONSUMPTION SPEED, LOCATION, ALLOWANCE, OR COMBINATIONS OF THE SAME

RELATED APPLICATION

This application claims priority to PCT Application No. PCT/EP2018/062680, filed on May 16, 2018 which is incorporated herein by reference in its entirety.

FIELD OF THE INVENTION

The present invention relates to an apparatus, a method, and a computer program product related to quota allocation by an online charging system.

Abbreviations
OCS: Online Charging System
PCRF: Policy Charging Control Function
GGSN Gateway GPRS Support Node
HLR Home Location Register
HPLMN Home PLMN
IP-CAN IP Connectivity Access Network
P-GW PDN Gateway
PDN Packet Data Network
UTRAN UMTS Terrestrial Radio Access Network
AMF: Core Access and Mobility Management Function
AUSF: Authentication Server Function
NEF: Network Exposure Function
NRF: NF Repository Function
PCF: Policy Control Function
SMF: Session Management Function
UDM: Unified Data Management
UPF: User Plane Function
MME: Mobility Management Entity
HSS: Home Subscriber Server
APN: ACCESS POINT NAME
DNN: Data Network Name
QoS: Quality of Service
CAPEX: Capital Expenditure
OPEX: Operational expenditure
3G: 3rd Generation Network
4G: 4th Generation Network (LTE)
5G: fifth Generation Network
RAT: Radio Access Technology
CCR: Credit Control Request
CCR-I: Credit Control Request-Initial
CCR-U: Credit Control Request-Update
CCR-T: Credit Control request-Terminate
RAR: Re-Authorization-Request
SNR: Spending Status Notification Request
LTE: Long Term Evolution Network (4G Network)
VoLTE: Voice over LTE
ViLTE: Video over LTE
IoT: Internet of Things
M2M: Machine to Machine communication
NSI ID: Network Slice Instance Identifier
NSSAI: Network Slice Selection Assistance Information
PDN: Packet Data Network
SUPI: Subscription Permanent Identifier
PEI: Mobile Equipment Identity
IMEI: International Mobile Equipment Identity
TAC: Type Allocation code (as part of IMEI)
TAC: Tracking Area Code (as part of location)
MSISDN: Mobile Station ISDN Number
IMSI: International Mobile Subscriber Identity
UE: User Equipment
NEF: Network Exposure Function
CHF: Charging Function
AVP: Attribute Value Pair
CLCI-C: Closed-Loop Charging (Control) Interface Client

BACKGROUND OF THE INVENTION

Upon request from a network entity (NE, e.g. GGSN, PGW, or SMF), OCS provides quota for a service (e.g. a data session, a call, . . . ) to be provided to a subscriber. For example, the quota may be a data volume or a time. The quota has a corresponding dimension (volume: Byte, Kbytes, Mbytes, Gbytes, Duration: sec, min, Hour, . . . ). Quota has also a validity time. After quota exhaustion (i.e., the granted quota is used) or quota expiry (i.e., the validity of the quota has elapsed) (or shortly before exhaustion/expiry based on configured thresholds of the quota size and validity time, respectively), the NE requests reauthorization, indicating also the used quantity of previously allocated/granted quota. The validity time may be a fixed time or a configurable time.

In 3GPP, the diameter protocol is used for this purpose. The relevant commands from NE to OCS are CCR-I (at the beginning of a session, call, etc.), CCR-U (re-authorization), and CCR-T (end of the session, call etc.).

In addition, the NE may regularly report to OCS on the consumed quota and request an update of the quota (quota allocation), even if validity time of the previously allocated quota has not expired yet and the previously allocated quota is not exhausted yet (by CCR-U in diameter). The time between two such reports/updates is sometimes also called a "slice".

OCS reserves an amount corresponding to the quota from the allowance of the subscriber, and deducts it from the allowance after it has been used (according to CCR-U and CCR-T, respectively). The allowance comprises the credit of the subscriber (e.g. in case of prepaid accounts or in case of volume tariffs), and may additionally comprise some benefits (e.g. from some promotion). Hereinafter, the terms allowance and credit may be used synonymously, if not otherwise indicated.

The allowance/credit of a subscriber may be divided into buckets for respective categories of data services. E.g., there may be a bucket for data transfer, one bucket for VoLTE, and another bucket for ViLTE. Depending on e.g. the tariff plan, credits from one bucket may or may not be transferred to another bucket.

If the allowance is exhausted and the subscriber is allowed to consume further services (i.e., if the subscriber is not a prepaid subscriber), OCS may grant quota, wherein an amount corresponding to the respective credit is deducted from the monetary balance of the subscriber. I.e., the subscriber is billed for the additional quota based on the monetary balance.

In general, balances refer to subscriber's main balance (that is, monetary balance) and subscribers buckets that can be monteray, volume, duration, item/unit. So, main balance is monetary only. Typically, operators want to use allowance/credit from subscriber's buckets before start using main balance.

SUMMARY OF THE INVENTION

It is an object of the present invention to improve the prior art.

According to a first aspect of the invention, there is provided an apparatus, comprising means for monitoring configured to monitor if a request for granting a requested quota for a subscriber is received; means for calculating configured to calculate a quota consumption speed based on a consumption of a previous quota granted to the subscriber and a duration during which the previous quota is consumed; means for determining configured to determine a determined quota size based on the quota consumption speed; means for granting configured to grant a granted quota to the subscriber in response to the received request, wherein the granted quota has the determined quota size.

The previous quota may comprise plural quota previously granted to the subscriber, and the duration may comprise corresponding plural durations.

The request for granting, the quota consumption, the determined quota size and the granted quota may be related to one of plural categories.

The apparatus may further comprise means for monitoring configured to monitor an available allowance for the subscriber; and means for setting configured to set the granted quota based on the available allowance for the subscriber.

The apparatus may further comprise means for identifying configured to identify a location of the subscriber; means for requesting configured to request an indication of a network load in a geographical area comprising the location of the subscriber; wherein the means for determining is configured to determine the determined quota size based on the network load in the geographical area.

According to a second aspect of the invention, there is provided a method, comprising monitoring if a request for granting a requested quota for a subscriber is received; calculating a quota consumption speed based on a consumption of a previous quota granted to the subscriber and a duration during which the previous quota is consumed; determining a determined quota size based on the quota consumption speed; granting a granted quota to the subscriber in response to the received request, wherein the granted quota has the determined quota size.

The previous quota may comprise plural quota previously granted to the subscriber, and the duration may comprise corresponding plural durations.

The request for granting, the quota consumption, the determined quota size and the granted quota may be related to one of plural categories.

The method may further comprise monitoring an available allowance for the subscriber; and setting the granted quota based on the available allowance for the subscriber.

The method may further comprise identifying a location of the subscriber; requesting an indication of a network load in a geographical area comprising the location of the subscriber; wherein the determined quota size is determined based on the network load in the geographical area.

According to a third aspect of the invention, there is provided a computer program product comprising a set of instructions which, when executed on an apparatus, is configured to cause the apparatus to carry out the method according to the second aspect. The computer program product may be embodied as a computer-readable medium or directly loadable into a computer.

According to some embodiments of the invention, in line with any one of the above aspects, both calculation of quota consumption speed and determination of quota size can be performed/realized at an OCS (side), or calculation of quota consumption speed can be performed/realized at a network entity (e.g. 3G GGSN/4G PGW/5G SMF) (side) and determination of quota size can be performed/realized at a OCS (side). In the latter case, the calculated quota consumption can be transmitted from the network entity (e.g. 3G GGSN/4G PGW/5G SMF) (side) to the OCS (side) via a charging interface.

That is, any apparatus can comprise corresponding means, and any method can comprise corresponding steps/operations, at respective instances/sides.

According to some embodiments of the invention, at least one of the following advantages may be achieved:
- Optimizing network resources by reducing transaction per second (TPS) rate by allocating bigger quota when available allowance is high;
- Avoiding credit/allowance/Bucket/balance starvation by a subset of data traffic booking big quota, which prevents other data traffic from allocating their quota;
- In case of a group of members sharing credit/allowance/Bucket/balance, starvation by some members allocating big quota (thus preventing other members from allocating quota from allowance) may be avoided without losing accuracy in not exceeding allowance/credit;

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Hereinafter, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of the invention provide a method for flexible quota allocation based on agile rules to determine the allocated quota size dynamically using a smart consumption speed calculation algorithm. In addition, a balance may be identified between allocating bigger quota when the level of available allowance is high to reduce signaling overload between Network elements and allocating smaller quota when the level of available allowance is low to avoid starvation. Accordingly, the number of TPS for quota allocation may be reduced, which improves customer data experience and also contributes to reduce CAPEX/OPEX by reducing number of deployed HW servers/CPUs to support required capacity.

According to some embodiment of this invention, quota size determination is improved by additionally applying other (key) parameters. It may be applied to methods such as the method of allowance segmentation into multiple blocs regardless where the quota was allocated. This method is described further below at greater detail.

The importance of the size of allocated quota to GGSN/PGW/SMF in 3G/4G/5G networks is that when the quota size is small it may generate signaling overload on Core Network elements (in particular for GGSN, PGW, SMF and OCS) which may lead to an increase in CAPEX for deploying higher capacity with increased Hardware and Software licenses cost to afford this overload. On the other hand, when the quota size is big it may lead to balance starvation either preventing quota allocation to other services in case of multiple sessions or preventing quota allocation for other group's member in case of shared tariff plan between group of members.

Large quota sizes may also lead to start debiting from monetary balance before buckets are exhausted (in cases where large quota had been booked for data categories from buckets and are not really used, and it is reported only later (after expiry of the relatively long quota size) that only parts of the quota had been used). This unexpected debit from main balance may cause the result that it is inconsistent with commercial offer agreed with subscribers before, which may cause complaints or even suits to service providers.

Some embodiment of the invention provide an algorithm using dynamic Time-Rolling window for determining quota sizes. The algorithm may be agile, which means that the algorithm is flexible (e.g. with respect to the window's size) and may use minimum additional computational resources and memory. The algorithm may use plural quota allocations to calculate consumption speed during ongoing session. The calculated consumption speed shall influence the quota size for the next quota allocation for the traffic. This agile algorithm shall accumulate the total data usage during this time-rolling-window period for calculating consumption speed. It shall also define rules for window time-Rolling-reset and rules for considering previous window's stored average speed and weight.

With this agile method, OCS shall dynamically adjust the quota size based on quota consumption speed, which is dynamically calculated. In addition, it may apply also multiple rules using subscriber profile, available allowance/credit, network information such as 5G network Slice Instance or 5G Network Slice Selection Assistance Information (NSSAI), 5G Data Network Name (DNN) or 3G/4G Access Point Name (APN), Access Technology, Category of data service or Rating Group and service identifier, device type (5G PEI and/or 3G/4G IMEI/TAC or provisioned value), 5G SUPI and/or MSISDN and/or IMSI, subscriber's Location (Such as HPLMN or Roaming), group size for family/corporate shared plan, QoS Range Label, special Date (Like Christmas Day, New Year day, Thanksgiving day, St Valentine Day, . . . ), Special time range, etc.

According to some embodiments of the invention, this agile method for consumption speed calculation can be implemented:
at the OCS side, or
at the 3G GGSN/4G PGW/5G SMF side.

In case of implementation at the 3G GGSN/4G PGW/5G SMF side, the calculated consumption speed can be transmitted from the 3G GGSN/4G PGW/5G SMF to the OCS, via the charging interface, in order to enable quota size determination based thereon at the OCS side.

Some methods of this invention find a right balance between
Optimizing network resources and reducing their overload and generated signaling transaction between network elements by allocating larger quota size when the level of available allowance is high
Avoiding allowance starvation by allocating smaller quota size when the level of available allowance is low.

Some embodiments of the invention allow dynamic determination of quota size to allocate based on quota consumption speed. It is provided an agile algorithm/method to calculate the quota consumption speed. There are multiple ways to calculate consumption speed. In some embodiments, only one of the ways is implemented. In other embodiments, plural ways may be flexibly configured, e.g. by a corresponding parameter in the OCS. Some of the ways are:

1) Adaptive quota allocation based on simple speed method: The quota consumption speed can be calculated based on the consumption speed of last allocated quota as follows: Previous consumed quota size/(elapsed time between previous credit request (CCR-I or CCR-U) and current credit request (CCR-U))

2) Adaptive quota allocation based on Fixed-Window for determining the consumption speed: This allows using a longer time window (over plural credit requests) to calculate consumption speed. The windows will last for a configurable number of quota allocations. That means the window will use the provisioned number of quota to calculate quota consumption speed. Such a window can be configured to be e.g. 3 slices or 5 slices. Then the speed of quota consumption will be calculated based on accumulated usage of these 3 or 5 quota allocations. The number of slices comprised in each window for the calculation of the quota consumption speed (e.g. 3 or 5 in above examples) can be configured e.g. on global level or subscriber profile level or tariff plan level.

3) Adaptive quota allocation based on Dynamic Time-Rolling window speed method: This allows using a longer time window than according to 1) to calculate consumption speed. The cumulative period (e.g. x hours) can be configured e.g. on subscriber's class of service level. OCS shall cumulate the usage within the period to calculate the consumption speed. The accumulated reported total data usage during this time-rolling-window period shall be used for calculating consumption speed. Rules may also be defined to take into consideration the window time-Rolling-reset. For example, this window may be terminated at reception of Credit Control Request—Termination and reinitiated (restarted) at reception of Credit Control Request—

Initial. In case of a long session (more than X hours or even days), the window may be reinitiated/restarted under certain conditions. Rules may be defined for considering previous window's stored average speed and weight. Below, there is a detailed description of the Dynamic Rolling-Time Window method for consumption speed calculation according to some embodiments of the invention:

a) Enable the definition of longer window period for consumption speed. In the example, the window period may be the same for all categories of data services of one subscriber, but in general, same or different window periods may apply to different categories.

b) The "window for consumption speed works per data category". Data category can start/end during session. Thus, when category is closed, window for consumption speed is stopped. After category start again, restart window again.

c) The window starts from beginning of quota consumption for that category to cumulate the total data usage, to calculate the consumption speed.
   i. If "dynamic time-rolling monitoring window period" (i.e., a parameter defining the window period in number of credit re-authorization requests) is set 0 then the speed is calculated per quota allocation, i.e. consumption speed=each size of consumed quota/respective time interval for consuming the quota.

Otherwise, if dynamic time-rolling monitoring window period >0, then speed is calculated by cumulative usage within the window period per category at each credit re-authorization request (like CCR-U in Diameter) until the window period is reached. The calculated consumption speed may take into account previous window's period average speed with some weight.

d) Thus, the dynamic time-rolling monitoring window starts from beginning of category for calculation of quota consumption speed. This Window can be terminated and restarted to cumulate the usage within a new window when:
   i. Window's period is reached,
   ii. or if credit re-authorization request is received indicating that previously allocated quota had its validity time expired (such as CCR-U in Diameter with reporting reason Validity-Time indicating that allocated quota validity time expired)
   iii. or if credit re-authorization request is received indicating that previously allocated quota is unused (such as CCR-U in Diameter with reporting reason=Quota Holding Time indicating that allocated quota is unused)

e) When window is reset, Window average speed is stored as previous window average speed and reused in next window with a weight determined as below:
   i. Weight is associated for current window period=accumulated duration in current window period/Provisioned window duration
   ii. Weight is associated for previous window period=1−Weight for current window period f) The calculated consumption speed of current window period per credit control request for quota allocation may be calculated taking into account previous windows's period average speed with its weight as below:
   i. Average Consumption speed=previous Period Consuming Speed*Weight for previous period+(total usage till current quota allocation (i.e. until current credit control request) within the window/duration till current quota allocation within the window) *Weight for current period g) The calculated consumption speed will impact the quota size for the next quota allocation.

h) This method may applicable to single subscriber or a subscriber within a group.

In some embodiments, all quota allocations of plural (or even all) categories may be taken into account for calculating the consumption speed and adapting the quota sizes accordingly.

Figure 1:
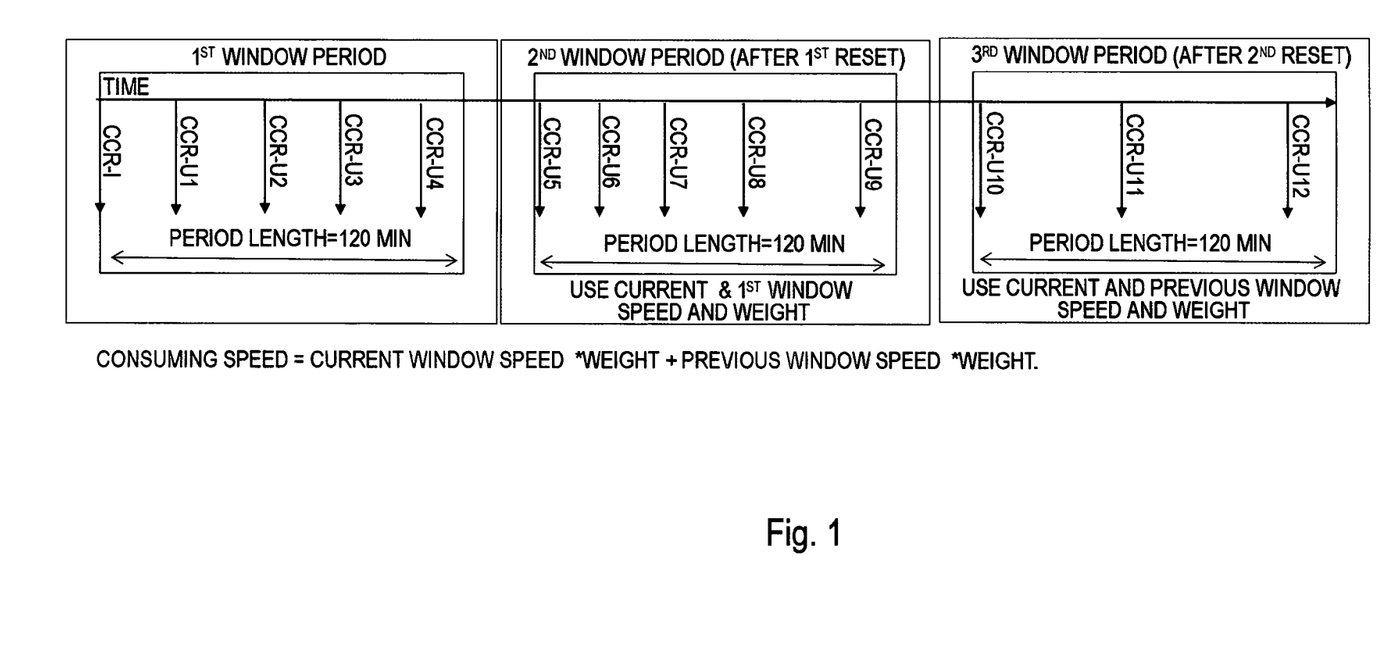
FIG. 1 illustrates one option of the Time-rolling window speed method according to some embodiments of the invention.

FIG. 1 illustrates one option of the Dynamic Time-Rolling window speed method according to some embodiments of the invention. In FIG. 1, it is shown when the NE requests quota from OCS by CCR-I or CCR-U. Each period has a duration of 120 min. In the $3^{rd}$ period, the size of the quotas is enhanced over that of the $1^{st}$ and $2^{nd}$ periods because of the consumption speed calculated for the $1^{st}$ and $2^{nd}$ window periods. After each period, the window is reset. However, the method may still take into account the consumption speed of the previous window, which is included in the calculation with a certain weight.

In the example of FIG. 1, the quota have a dimension of time. Even within each time window for calculating the quota consumption speed, the quota size may be changed to the calculated consumption speed. In the third time window, the quota size is larger from the beginning because of the consumption speeds calculated for the first and second time windows.

Figure 2:
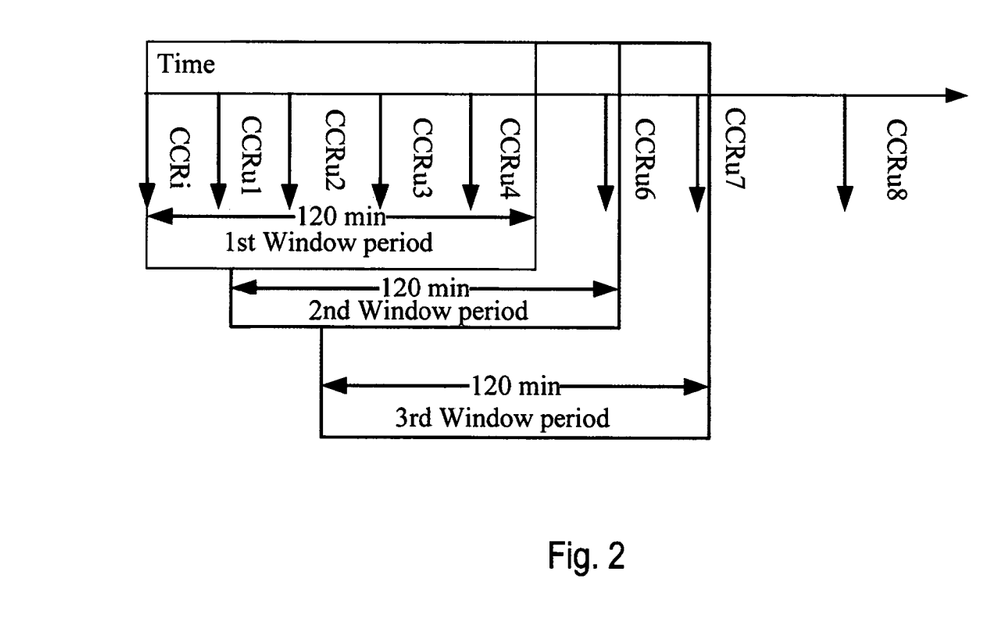
FIG. 2 illustrates another option of the Time-rolling window speed method according to some embodiments of the invention.

FIG. 2 shows a second option of this algorithm with overlapped rolling time window for consumption speed calculation. In this option, the window (and the total consumption therein) is calculated each time when a Credit Control Request (such as Diameter CCR-Update in 3G/4G networks and HTTP2 POST or HTTP2 PATCH . . . /Nchf_ChargingControl/Nchf_ChargingControl_UpdateReport/ . . . in 5G network) is received, so the windows may be overlapped in part.

FIG. 2 shows the sliding window. The window length is configurable, but the window is slided with the CCRu reporting to OCS during the session. The consumption speed is calculated by the consumed quota size in the current window (according to CCR-Us received in the current window) and a consuming interval (either time interval from the first CCR-U in the current window to the last CCR-U in the current window, or time interval from the last CCR-U before start of the current window to the last CCR-U in the current window) within current window (e.g. 120 min). This is different from the option of FIG. 1, which considers the consuming speed and weight of current window and may also consider the speed from the start of the session.

Figure 3:
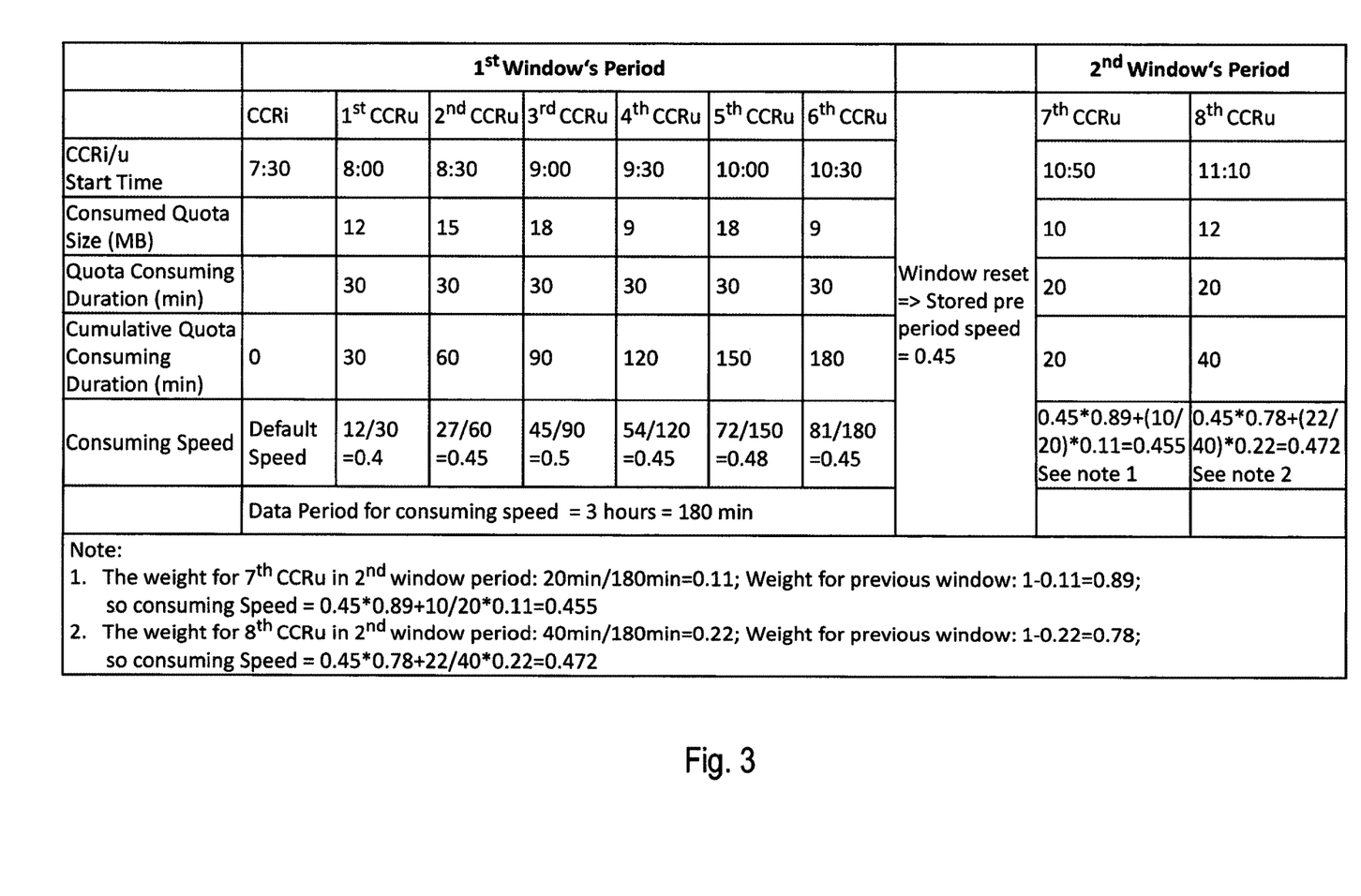
FIG. 3 illustrates a determination of the quota consumption speed used in some embodiments of the invention.

FIG. 3 illustrates an example of consumption speed calculation based on Dynamic Time-Rolling window speed method (without overlapping windows). As use case example, the window period for calculating consumption speed is defined as 3 hours (at subscriber's class of service level).

FIG. 3 shows an example of a session starting at 7:30 and the reported usage at each credit control request (such as CCR-U in Diameter; in the example NE reports every 30 minutes in the $1^{st}$ window and every 20 minutes in the $2^{nd}$ window) and the calculated consumption speed. The consumption speed in the second time window is calculated taking into account the calculated consumption speed of the first time window with some weight corresponding to a quotient of the total duration of the first time window and the actual (elapsed) duration of the second time window.

In some embodiments, the weight may be different from the above quotient. For example, it may comprise an additional factor reducing the weight of the first window the longer the first window has been passed. As another option, the quotient of some power (e.g. square) of the respective times may be calculated for the weight. In a third time window, only the calculated consumption speed of the second time window may be taken into account with some respective weight.

In some embodiments of the invention, in addition to the quota consumption speed, further criteria may be considered to determine the validity time. Some of these options are explained now:

4) Enhancement of Adaptive quota allocation based on Dynamic Time-Rolling window speed method with segmented allowance (Blocs of Allowance)
   a) In some embodiments, the allowance is segmented into multiple blocs for more performance. With this method the balance and buckets can also divided into multiple blocs, each bloc is assigned to different slicing policies. Thus, the bloc Id will be also a parameter for determining the size of allocated quota. With this method, each bloc can also have parameters for determining the size of allocated quota that OCS will grant to NE (e.g. GGSN/PGW/ SMF in 3G/LTE or 5G networks). For example, allowance can be divided into 3 blocs
      i. High Level Bloc where the available allowance/ available credit is high (this is typically the case for example at beginning of billing cycle). Such as when available allowance/credit is between 500 MB and 1 GB.
      ii. Medium Level Bloc: for example when available allowance credit is between 100 MB and 500 MB
      iii. Low level Bloc: for example when available allowance is between 0 and 100 MB.
   b) Each bloc may have a Bloc ID and dedicated quota allocating policy such as maximum quota size, minimum quota size, recommended size of allocated quota as % of available allowance. These may be configured per bloc and additionally e.g. per RAT, per subscriber profile, and/or per tariff plan level, with highest priority to configuration at bloc level. Such configuration on bloc level of parameters max/ min/percentage of allocated quota size allows to avoid the much traffic when allocation percentage becomes smaller and smaller, especially in the last block. For Example, the size of quota in High level bloc=10% of available allowance in case of access technology=3G and size of quota in same high level bloc=15% of available allowance in case of access technology=4G. But, the size of quota in mid level bloc=5% of available allowance in case of access technology=3G and size of quota in same high level bloc=8% of available allowance in case of access technology=4G. etc.
   c) Instead of blocs, there may be a continuous function of the allocated quota size in dependence of the available allowance.

Figures 4, 4A:
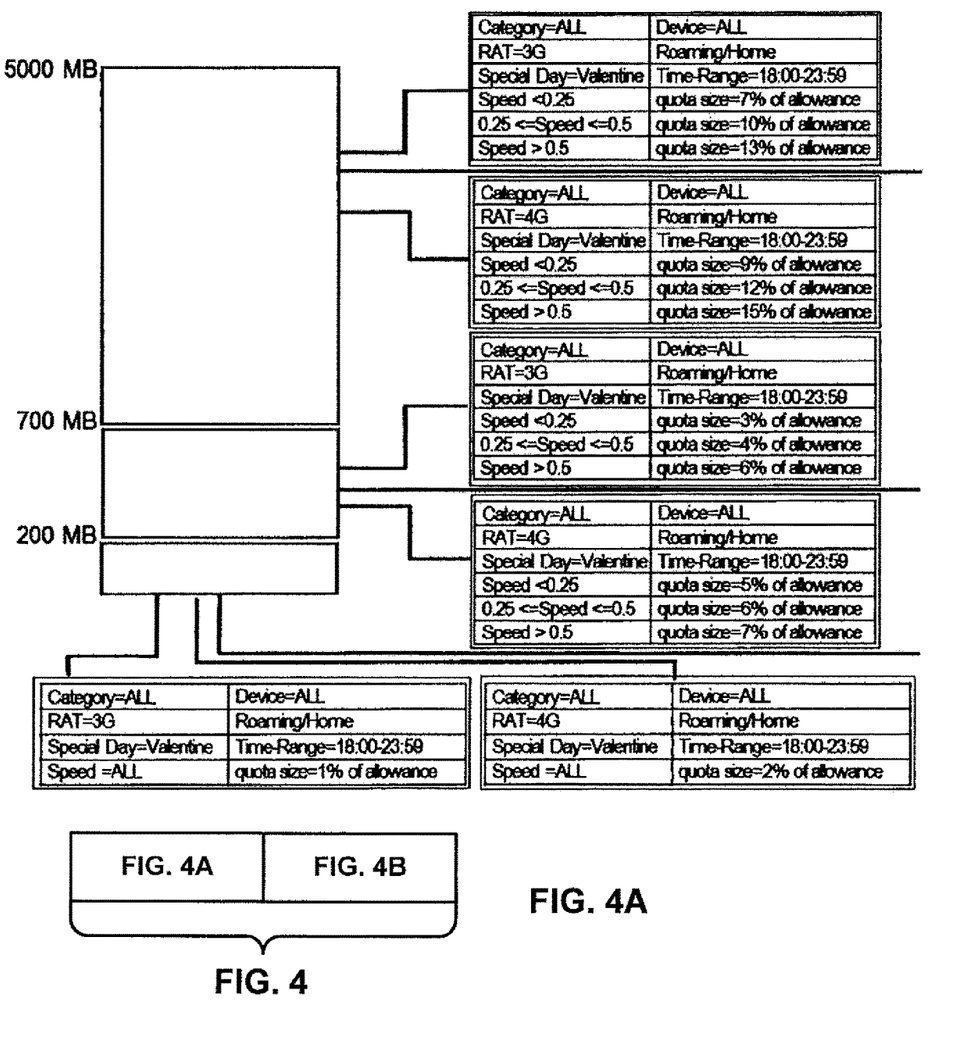
FIG. 4 shows an example of different policies depending on the available allowance and consumption speed according to some embodiments of the invention.
Figure 4B:
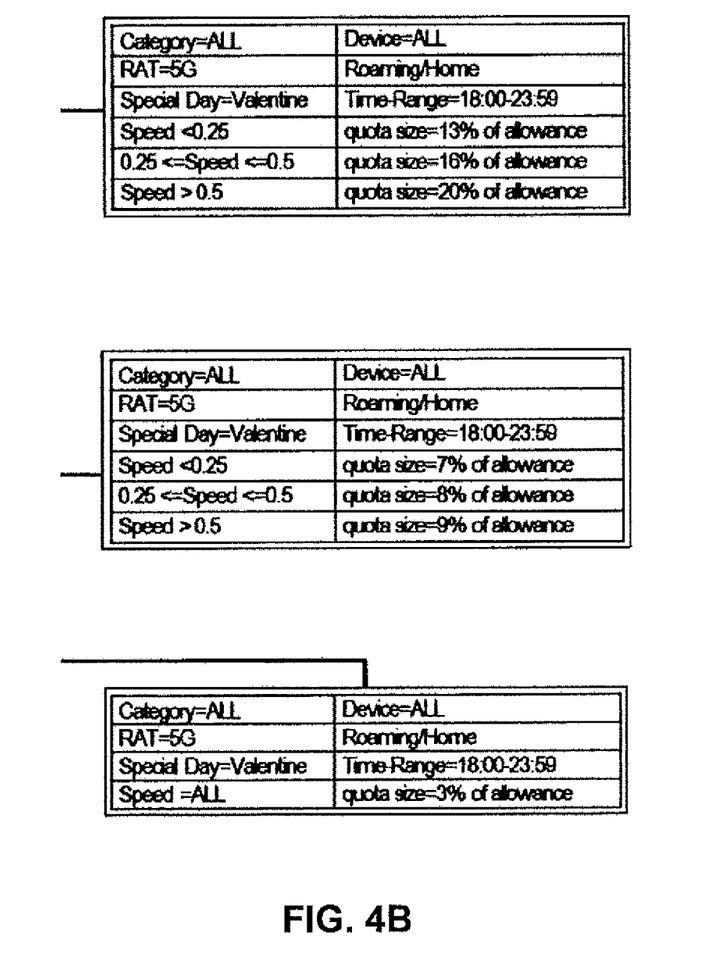

FIG. 4 shows an example of different policies depending on the available allowance and consumption speed.

With this method, the parameters like the Validity Time (VT) of allocated quota as well as other parameters like Quota Holding Time (QHT) and Volume Quota Threshold (VQT) can be provisioned on each bloc. If allowance is divided into multiple blocs, when the remaining allowance (after deducting the allocated quota size) crosses one or more block borders then the parameters VT, VHT, VQT in the last block shall be applied. QHT is the AVP Quota-Holding-Time set in CCA by OCS. The CLCI-C (or more general: the diameter Gy client) will deem a traffic flow to have terminated when the quota holding time (QHT) is elapsed and shall report usage. The client shall start the quota holding timer on receipt of a CCA and re-start it at the end of each packet. VQT is the AVP Volume-Quota-Threshold set in CCA by OCS. It shall contain a value indicating the quota threshold for volume quota in the CLCI-C. This value is a number of units which are bytes. It means, when a quota is almost expired (i.e. when only the Volume-Quota-Threshold amount of bytes is left) the CLCI-C must ask for more quota to the CLCI-S.

d) With this method, the definition of Max quota size/Min quota size per Bloc Level shall allow to avoid the much traffic when allocation percentage becomes smaller and smaller, especially in the last block.
      i. If the remaining allowance (after deducting the allocated quota size) crosses one or more block borders or one or more buckets' block borders, OCS shall get the Max/Min in the last bucket/balance block.
      ii. For multiple usage types, the Max/Min quota size shall be the smaller one of the two usage types (e.g. primary usage type applies bucket, but second usage type applies balance). For example, in a complex charging scenario, the data usage may be charged by dual rates: e.g. roaming data usage is charged with 0.5 EUR/MB for national cost and additionally with 0.8 EUR/MB for roaming cost. OCS may allow to define different Max/Min quota size on both two rates at the same time. In this case, OCS decides to apply the smaller one of the two Max/Min quota sizes and control the actual allocated quota accordingly.
   e) Avoiding starvation par triggering credit-reauthorization (such as RAR in Diameter) might generate overload of consequent transactions and impact network performance. This should be configured to be allowed only in specific situation when set of conditions are satisfied. Some embodiments of this invention provide also flexible configurable rules to enable OCS controlling Credit-Reauthorization frequencies (such as Diameter RAR), for example:
      i. Credit re-authorization could be triggered upon crossing specific threshold (Balance/bucket Bloc threshold) such as when triggering Credit re-authorization may occur only when crossing the threshold of low level blocs. For example, when some category report usage is reported to OCS, OCS updates the used credit in bucket or main balance. If the bucket value or main balance is reduced across the pre-defined threshold, then OCS can configure to send RAR to all or part of ongoing categories and force them to report usage, so that OCS can adjust quota size for those ongoing categories, to avoid that some categories are starved by some 'inactive' categories reserving large quota size.
      ii. Selected sessions could be based on Calculated consumption speed and session's Age [since last/ previous credit control request for quota allocation].

5) Enhancement of Adaptive quota allocation based on Dynamic Time-Rolling window speed method with group's size of shared plan (number of member in shared plan account)

a) In some embodiments, the allocated quota size is also based on group size of shared plan (number of members in shared plan account). Group size for the allocation percentage in each bloc for group level shared bucket/balance
   i. Allocated quota size will be based on the number of members in the group account at the time of the quota allocation so it could change during the session.
   ii. The allocation % per group size is considering the total provisioned number of member per group
b) Allows definition of Max quota size/Min quota size per Bloc Level. Definition on block level to avoid much traffic when allocation percentage becomes smaller and smaller, especially in the last block.
   i. If the remaining allowance (after deducting the allocated quota size) crosses one or more block borders or one or more buckets' block borders, OCS shall get the Max/Min in the last bucket/balance block.
   ii. For multiple usage types, the Max/Min quota size shall be the smaller one of the two usage types (e.g. primary usage type applies bucket, but second usage type applies balance).
6) Enhancement of Adaptive quota allocation based on Dynamic Time-Rolling window speed method with Network Slice Instance identifier (NSI Id) and/or Network Slice Selection Assistance Information (NSSAI) as well as 5G Data Network Name (DNN) as parameters for determining the size of allocated quota to take into account the profile of services deployed in this network Slice.
7) Enhancement of Adaptive quota allocation based on Dynamic Time-Rolling window speed method with radio cell (or TAC +Cell Identity) overload level as parameters for determining the size of allocated quota.

Charging Function system (OCS) may subscribe to specific monitoring events information reported via the NEF such as the "Number of User Equipments (UEs) present in a geographical area" or other parameter/event that allow to give an indication of the overload status of this geographical area. Location granularity could be at cell level (Cell ID), Tracking Area Code level (TAC) or other formats supported by NEF and/or AMF. Based on periodically collected information by Charging Function System about "Number of User Equipments (UEs) present in a geographical area, of TAC and/or Cell of interest, thresholds can be defined by Operator to reflect overload status and influence the size of allocated quota in adaptive way when a quota is requested for subscriber with data session from these locations to avoid overload of given zone and promote the usage on less overloaded zone.

Charging system may get subscriber's location information from credit control request and use it to get the overload status of this location from stored information based on collected "Number of User Equipments (UEs) present in cell ID or TAC ID". Thresholds shall be defined on this Database to provide indication about overload status of these zones. These thresholds shall influence the quota size to be allocated in response to credit control request from SMF as well as (optional) the bandwidth/Quality of service (QoS) of data session through the interaction between Charging System and 4G PCRF and/or 5G PCF in order to throttle and/or un-throttle the bandwidth of data session.

In other words, normally, if the load is heavy in a cell, the QoS and RAT provided to (at least some of the) UEs shall not be same as in case of normal load. I.e. when network is busy, the 4G network or QoS will be lowered to 3G/2G QoS. This QoS or RAT shall be handled by other NE, e.g. PCRF, HLR, GGSN etc.

OCS may get the load information from network. However, in some embodiments, OCS does not directly apply load indication to decide quota size. Rather, OCS gets the changed QoS/RAT from CCRu and calculates the quota consumption speed, and then OCS adjusts the quota size based on the calculated consumption speed and additionally on one or both of QoS and RAT.

Instead of or in addition to periodically requesting the number of UEs present in geographical area, OCS may perform such request event based, e.g. when a CCR is received.

Figure 5:
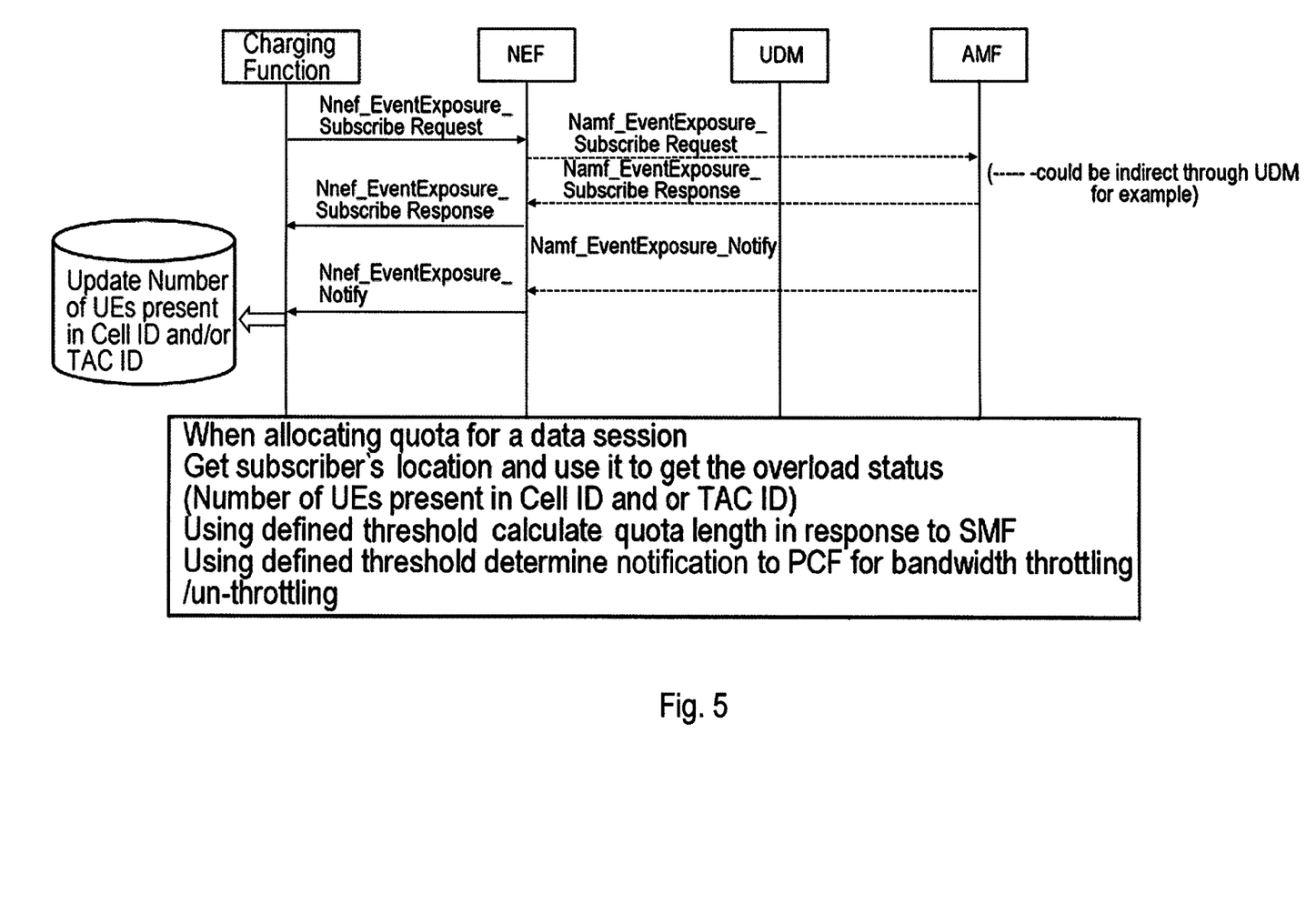
FIG. 5 shows an example communication according to some embodiments of the invention.

FIG. 5 shows an example of a communication between OCS and NEF.

The Adaptive quota allocation based on Dynamic Time-Rolling window speed method according to some embodiments of the invention is applicable to various network technologies and it is protocol agnostic and applicable to various traffic types (e.g. data sessions with different data categories including video, ViLTE/VoLTE, IoM, M2M, etc . . . ). It is applicable whatever the protocol type between GGSN/PGW/SMF network elements and the Online charging network element is. The protocol can be Diameter (like Diameter Gy in 3G/4G network) or HTTP2 5G Service-Based Architecture protocol for the interface Nchf between SMF and Charging Function (whatever with RPC-style interaction model or REST-style model or mixed or other). In 5G network, this Adaptive quota allocation method can be applied to 5G Charging principles where services such as Immediate Event Charging, Event Charging with Unit Reservation, Session Charging with Unit Reservation are exposed by Charging Function system playing the role of Producer and used by SMF playing the role of consumer. Charging Function can define and expose services operations such as a) Nchf_ChargingControl_Create or Get: to allow authorized consumer (such as SMF) to Request PDU session related resource of charging context from the charging function system and start charging session. SMF can send HTTP2 POST with URI identifying this resource at Charging function side and a request body (simulating the CCR-I in Diameter). The Charging system shall reply by HTTP2 201 success.

b) Nchf_ChargingControl_UpdateReport service operation for update charging session management to allow authorized consumer (such as SMF) to request new quota authorization from charging function and to report used quota. SMF can send HTTP2 POST or HTTP2 PATCH with URI identifying this resource at Charging function side and a request body containing the representation for requested quota and reported used quota as well as other parameters (simulating the CCR-Update in Diameter). The Charging system shall reply by HTTP2 201 success.

c) Nchf_ChargingControl_TerminateReport service operation for terminating charging session management to allow authorized consumer (such as SMF) to request terminating the created charging session and report last used quota. SMF can send HTTP2 POST with URI identifying this resource at Charging function side and a request body containing the representation for reported used quota as and session identifier to terminate (simulating the CCR-Terminate in Diameter). The Charging system shall reply by HTTP2 201 success.

d) Nchf_ChargingControl_SubscribeNotify or Nchf_ChargingControl_PushNotify service. This is based on subscribe-Notify or Push-Notify model that can be used for service exposed by Charging system to enable authorized consumer (such as SMF) to subscribe to Charging System notification when specific event occurred on subscriber's account (such as: No more credit, or subscriber had subscribed had purchased new subscription, or subscriber had performed an account Topup/refill, or account state is changed suspended/resumed etc). This allows to simulate the Diameter Gy Re-Auth-Request RAR sent by charging system to GGSN/PGW to force them sending credit re-authorization requests for ongoing session. This subscribeNotify or PushNotify model also can be used to simulate Diameter Sy Spending-Status-Notification-Request (SNR) between Charging Function System and Policy Control Function.

Figure 6:
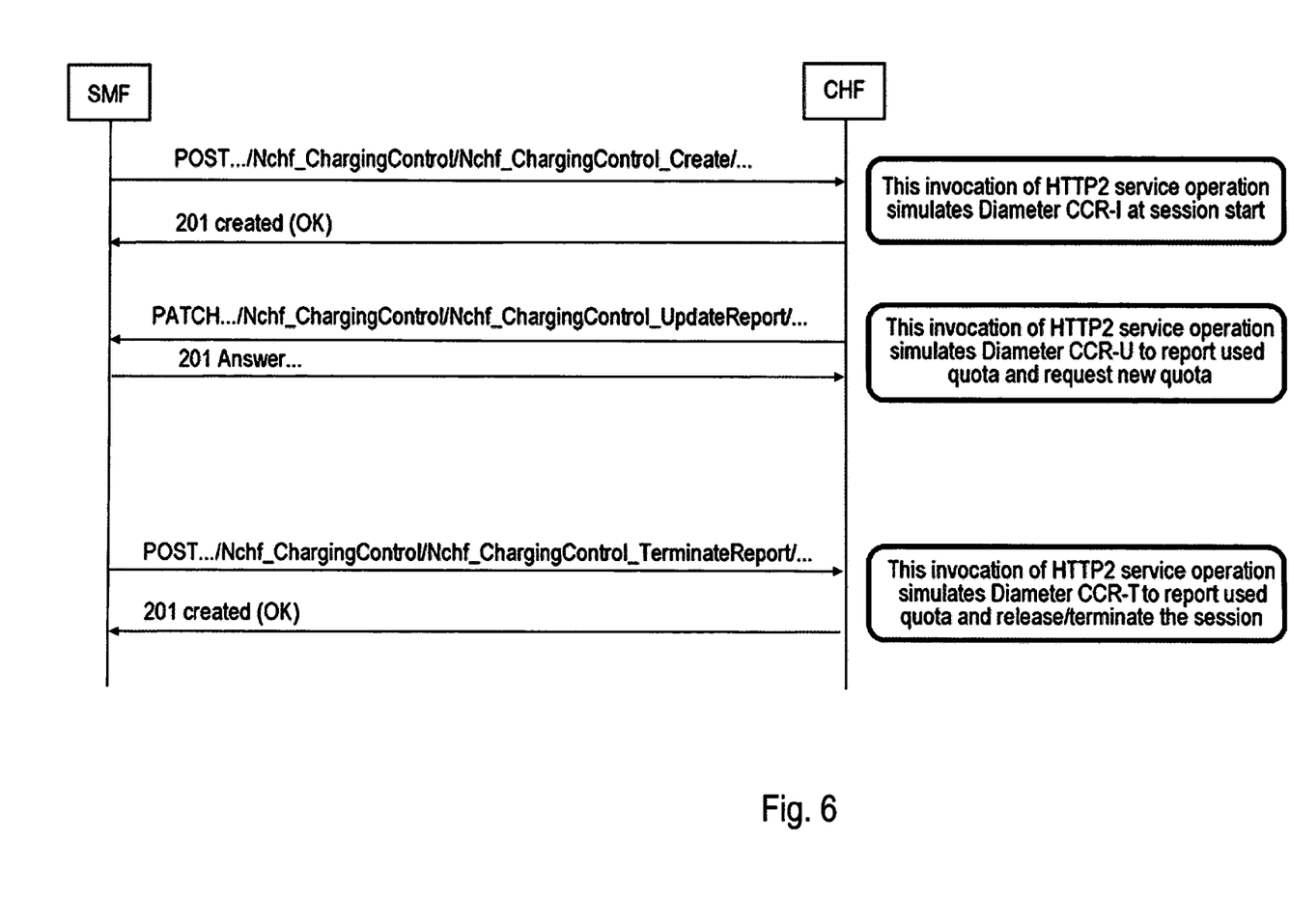
FIGS. 6 and 7 explain the correspondence between the 5G charging related commands and the 3G/4G charging related commands.
Figure 7:
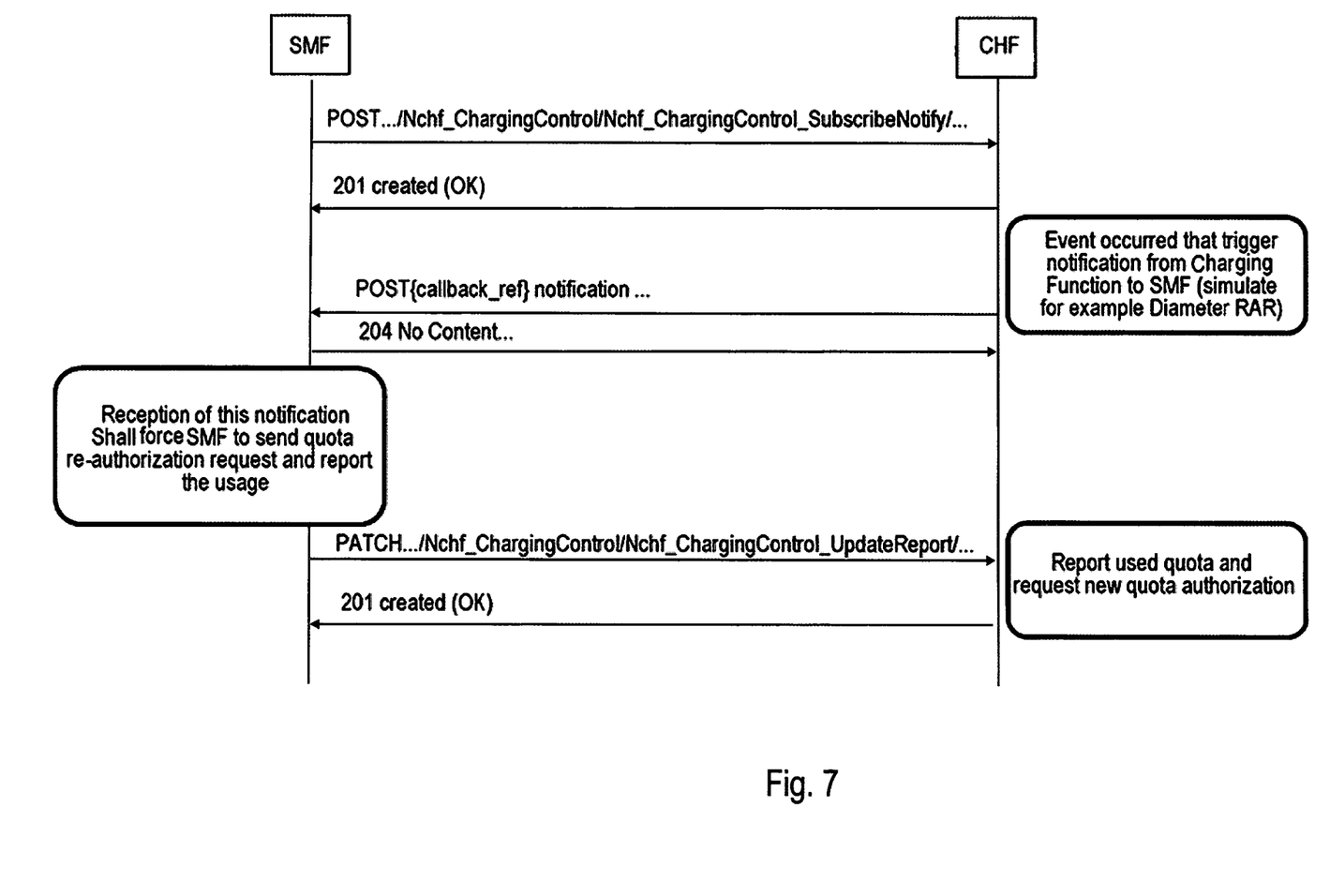

FIGS. 6 and 7 explain the correspondence between the 5G charging related commands and the 3G/4G charging related commands.

Figure 8:
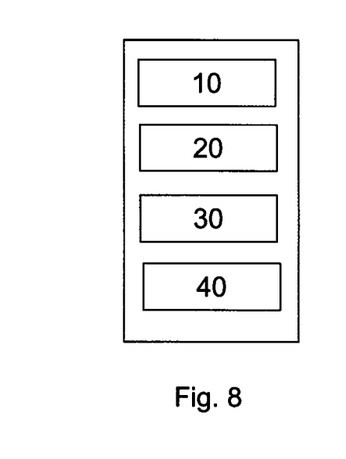
FIG. 8 shows an apparatus according to an embodiment of the invention.
Figure 9:
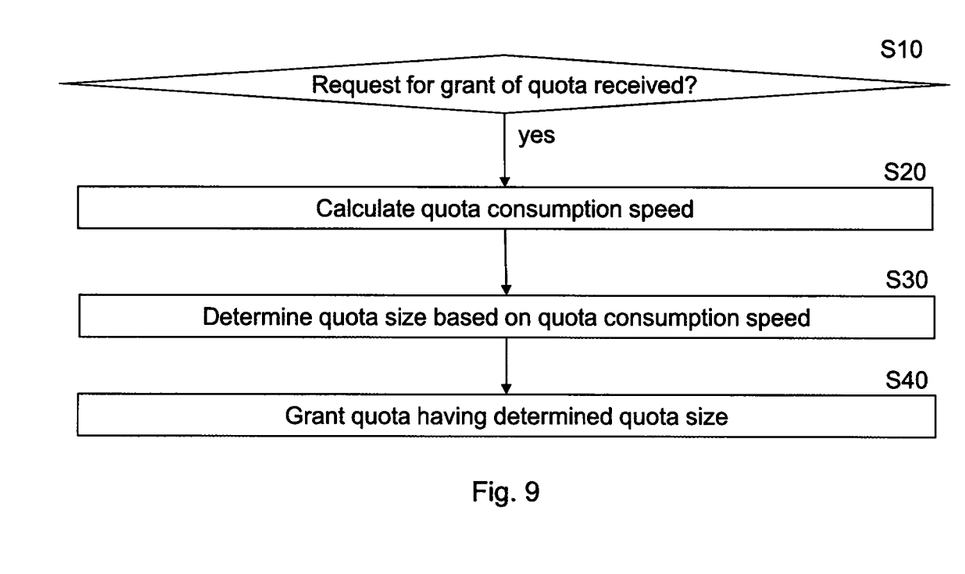
FIG. 9 shows a method according to an embodiment of the invention.

FIG. 8 shows an apparatus according to an embodiment of the invention. The apparatus may be an OCS or an element thereof. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for monitoring 10, means for calculating 20, means for determining 30, and means for responding 40. The means for monitoring 10, means for calculating 20, means for determining 30, and means for responding 40 may be a monitoring means, calculating means, determining means, and responding means, respectively. The means for monitoring 10, means for calculating 20, means for determining 30, and means for responding 40 may be a monitor, calculator, determiner, and responder, respectively. The means for monitoring 10, means for calculating 20, means for determining 30, and means for responding 40 may be a monitoring processor, calculating processor, determining processor, and responding processor, respectively.

The means for monitoring 10 monitors if a request for granting a requested quota for a subscriber is received (S10).

The means for calculating 20 calculates a quota consumption speed based on a consumption of a previous quota granted to the subscriber and a duration during which the previous quota is consumed (S20). For example, the quota consumption speed may be calculated by the quotient of the a consumption of the previous quota and the duration.

The means for calculating may calculate the quota consumption speed only if the request for granting a quota is received or regularly, independent from receipt of the request. In the last case, the last calculated quota consumption speed may be used by the means for determining 30.

The means for determining 30 determines a determined quota size based on the quota consumption speed (S30).

The means for granting 40 grants a granted quota to the subscriber in response to the received request of S10 (S40). The granted quota has the quota size determined in S30.

Figure 10:
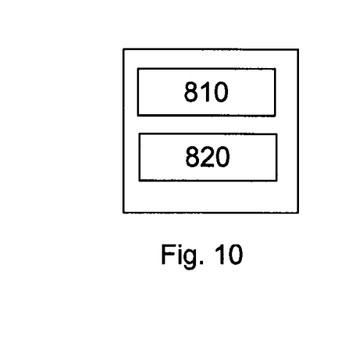
FIG. 10 shows an apparatus according to an embodiment of the invention.

FIG. 10 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform the method according to FIG. 9.

The relationship between quota consumption speed and quota size may be stored in a lookup table such as the one shown in FIG. 4. In some embodiments, the relationship may be given by a mathematical function, i.e., quota size=function (consumption speed). The table and the parameter(s) of the function, respectively, may be fixed or configurable.

In some embodiments, the consumption speed is calculated and the quota size is determined based on the consumption speed for every request (e.g. CCR-I or CCR-U). In some embodiments, the consumption speed is calculated only every n-th request (n=2, or 3, or 4, . . . ) and the quota size for an actual request is determined based on the last calculated consumption speed. In some embodiments, the quota size is kept constant for plural requests, and recalculated every m-th request only (m=2, or 3, or 4, . . . ).

Some embodiments of the invention are described with respect to a 3GPP network (e.g. a 3G network, a 4G network, a 5G network). However, the invention is not limited to 3GPP networks. It may be applied to other wireless or wired communication networks, such as a WiFi network, comprising an OCS or a similar function, too. In general, the invention is applicable to various types of subscribers, various types of traffic including Data service and VoLTE, devices, network technologies such as 3G, 4G or 5G, and tariff plans (such as standard data plans, IoT plans and shared plans for families or large enterprises).

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, an online charging system, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising at least one processor, at least one memory including computer program code storing computer program code that, when executed by the at least one processor, cause the apparatus to at least perform:
   monitoring whether a request for granting a requested quota for a subscriber is received;
   calculating a quota consumption speed based on (1) a consumption of a previous quota granted to the subscriber within a previous window and a first weight applied to the consumption within the previous window, and (2) a consumption of a quota granted to the subscriber during a current window and a second weight applied to the consumption within the current window, wherein calculating the quota consumption uses the following: quota consumption speed is equal to consuming speed during the previous window multiplied by weight for previous window, added to total usage until a current quota allocation within a current period multiplied by weight for the current period;
   determining a determined quota size based on the quota consumption speed;
   monitoring an available allowance for the subscriber; and
   granting a granted quota to the subscriber in response to the request being received, wherein the granted quota has the determined quota size, wherein the granting comprises setting a granted quota size based further on the available allowance for the subscriber.

2. The apparatus according to claim 1, wherein the previous quota comprises plural quota previously granted to the subscriber.

3. The apparatus according to claim 1, wherein the request for granting, the quota consumption, the determined quota size and the granted quota are related to one of plural categories.

4. The apparatus according to claim 1, further comprising identifying a location of the subscriber; requesting an indication of a network load in a geographical area comprising the location of the subscriber; wherein the determining the determined quota size further determines the determined quota size based on the network load in the geographical area.

5. A method, comprising
   monitoring whether a request for granting a requested quota for a subscriber is received;
   calculating a quota consumption speed based on (1) a consumption of a previous quota granted to the subscriber within a previous window and a first weight applied to the consumption within the previous window, and (2) a consumption of a quota granted to the subscriber during a current window and a second weight applied to the consumption within the current window, wherein calculating the quota consumption uses the following: quota consumption speed is equal to consuming speed during the previous window multiplied by weight for previous window, added to total usage until a current quota allocation within a current period multiplied by weight for the current period;
   determining a determined quota size based on the quota consumption speed;
   monitoring an available allowance for the subscriber; and
   granting a granted quota to the subscriber in response to the request being received, wherein the granted quota has the determined quota size, wherein the granting comprises setting a granted quota size based further on the available allowance for the subscriber.

6. The method according to claim 5, wherein the previous quota comprises plural quota previously granted to the subscriber.

7. The method according to claim 5, wherein the request for granting, the quota consumption, the determined quota size and the granted quota are related to one of plural categories.

8. The method according to claim 5, further comprising identifying a location of the subscriber; requesting an indication of a network load in a geographical area comprising the location of the subscriber; wherein the determining the quota size further comprises determining the quota size based on the network load in the geographical area.

9. A non-transitory computer-readable medium comprising a set of instructions which, when executed on an apparatus, is configured to cause the apparatus to carry out:
   monitoring whether a request for granting a requested quota for a subscriber is received;
   calculating a quota consumption speed based on (1) a consumption of a previous quota granted to the subscriber within a previous window and a first weight applied to the consumption within the previous window, and (2) a consumption of a quota granted to the subscriber during a current window and a second weight applied to the consumption within the current window, wherein calculating the quota consumption uses the following: quota consumption speed is equal to consuming speed during the previous window multiplied by weight for previous window, added to total usage until a current quota allocation within a current period multiplied by weight for the current period;
   determining a determined quota size based on the quota consumption speed;
   monitoring an available allowance for the subscriber; and
   granting a granted quota to the subscriber in response to the request being received, wherein the granted quota has the determined quota size, wherein the granting comprises setting granted quota size based further on the available allowance for the subscriber.

10. The apparatus according to claim 1, wherein the previous window is reset after a period, a consuming speed for the previous window is stored in response to the reset, and the current window starts after the reset.

11. The apparatus according to claim 1, wherein the first weight is set to one minus the second weight.

12. The apparatus according to claim 11, wherein the calculating is performed at a time occurring partway through a period for the current window, and wherein the second weight is calculated based on a duration of time that has passed in the current window for the calculating divided by a total duration of time for the current window.

13. The apparatus according to claim 1, wherein the calculating is performed at a time occurring partway through a period for the current window, and wherein the first weight is based on a quotient of a power of a time period of the previous window and the second weight is based on a quotient of a power of a time period in the current window from a start of the second window to the time.

14. The method according to claim 5, wherein the previous window is reset after a period, a consuming speed for the previous window is stored in response to the reset, and the current window starts after the reset.

15. The method according to claim 5, wherein the first weight is set to one minus the second weight.

16. The method according to claim 15, wherein the calculating is performed at a time occurring partway through a period for the current window, and wherein the second weight is calculated based on a duration of time that has passed in the current window for the calculating divided by a total duration of time for the current window.

17. The method according to claim 5, wherein the calculating is performed at a time occurring partway through a period for the current window, and wherein the first weight is based a quotient of a power of a time period of the previous window and the second weight is based on a quotient of a power of a time period in the current window from a start of the second window to the time.

* * * * *